J. H. McGOWAN.

Tobacco-Compress.

No. 8,838. Reissued Aug. 5, 1879.

Attest

Edgar J. Gross

C. F. Kraser

Inventor

John H. McGowan, by L. W. Hosea,

Attorney.

N. PETERS, PHOTO-LITHOGRAPHER, WASHINGTON, D. C.

UNITED STATES PATENT OFFICE.

JOHN H. McGOWAN, OF CINCINNATI, OHIO.

IMPROVEMENT IN TOBACCO-COMPRESSES.

Specification forming part of Letters Patent No. 79,769, dated July 7, 1868; Reissue No. 8,838, dated August 5, 1879; application filed July 10, 1879.

*To all whom it may concern:*

Be it known that I, JOHN H. McGOWAN, of Cincinnati, Hamilton county, Ohio, have invented a new and useful Improvement in Tobacco-Compresses, of which the following is a specification.

Tobacco-compresses have been constructed with four segmental sides having a circular exterior and inclosing a square area, in which the tobacco-plugs are placed to undergo the "finishing" process, or boxes of the same for compression of their contents in packing. The sides of the compress are usually of wood or cast-iron, secured by an exterior band or casing of wrought metal, divided for the purpose of allowing one of the segmental sides to be used as a door and give convenient access to the interior. As the contents of the compress are subjected to very great pressure, the fastenings of the hinged door are exposed to severe lateral strains, and are therefore required to be of great strength, and the proper use of the apparatus necessitates a conveniently-adjustable fastening.

The fastenings heretofore employed are open to many objections, owing to their peculiar construction, which rendered them difficult or troublesome to adjust and remove, besides being in the way of the operator and interfering with the free use of the compress in handling its contents when open.

The object of my invention is to provide a fastening which, while possessing the requisite strength, shall be more convenient of adjustment than those heretofore employed, yet so arranged as to offer no impediment to the free and convenient use of the apparatus in removing or replacing the contents when open.

To this end it consists, first, in the combination, with the hinged door of the compress, of one or more swinging eyebolts permanently secured to one side of the divided casing, adapted to engage a suitable fastening upon the other side of said casing, and to swing back out of the way when out of use; and, secondly, in the means for fastening said bolts and securing the door of the compress.

Figure 1:
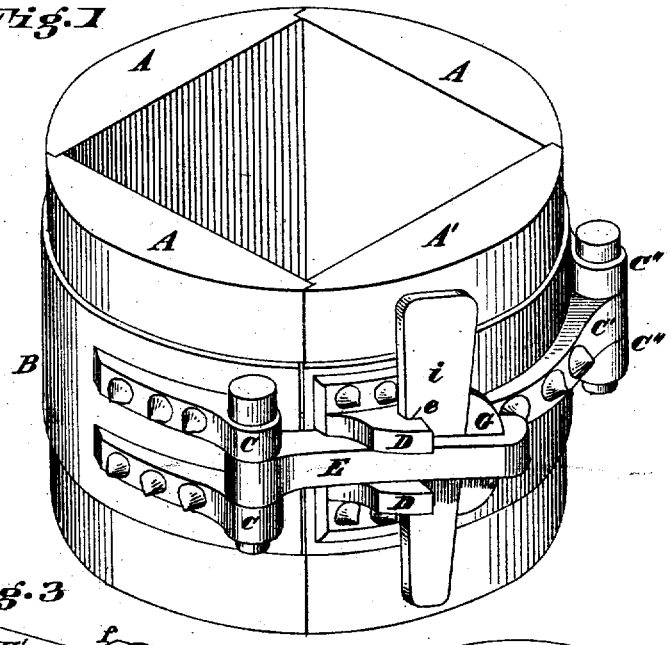
Figure 3:
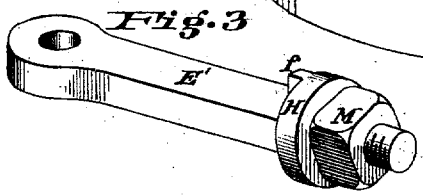
Figure 2:
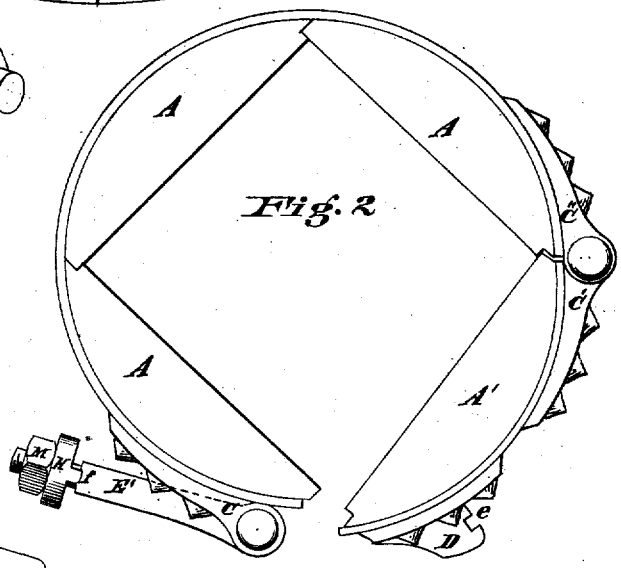
Figure 4:
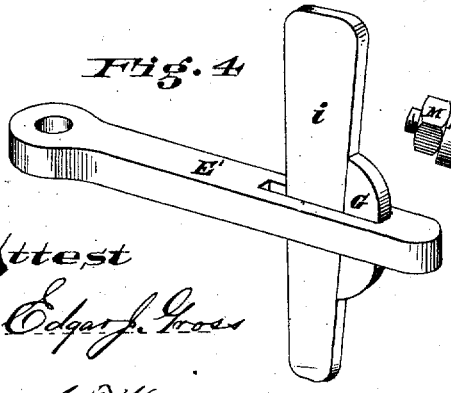

In the drawings herewith, Figure 1 represents, in perspective view, a tobacco-compress with my improvement; Fig. 2, a plan view of same, showing the door partially open and the bolt swung back. Fig. 3 is a detail perspective view of the eyebolt provided with a thread and bolt fastening, and Fig. 4 is a perspective view of the eyebolt with a wedge or key fastening.

The compress is constructed of four segmental sides, of wood or cast-iron, one of which constitutes the door by which access is had to the interior. Three of these sides, A A A, are firmly held together by a casing, B, of wrought metal, and a similar metal casing covers the exterior of the fourth side or door, A′, so that when the parts are secured together a substantially continuous metal casing encircles the exterior of the compress.

The door A′ is hinged at one side to the adjacent side of the compress by means of lugs C′ C″ C‴, riveted to the adjacent parts of the divided casing, and a suitable pivot-connection. The hinge thus constituted and all other parts of the apparatus are made of considerable strength to resist the strains caused by the pressure to which the contents of the apparatus are subjected.

To secure the door A′ in its closed position, I employ eyebolts E, pivoted between lugs or cleats C C, riveted to the casing B at one side of the door, so as to swing horizontally between the two extreme positions shown in Figs. 1 and 2. When the door is closed the eyebolts are swung toward the door and enter between lugs or ears D, which are securely riveted to the door-casing, and upon or against which the fastening devices have their bearing.

The lugs D are so formed as to have their greatest resisting power in the direction of the circumferential strains to which they are subjected, the form shown in Figs. 1 and 2 being preferred.

The fastening devices are more fully shown in Figs. 3 and 4. These consist, first, of a wedge or key, *i*, passing through a suitable slot in the eyebolt, and engaging the lugs or ears D.

In order to provide more effectually against the danger of the key or wedge slipping away from the lugs D, I provide recesses *e* in the face of the lugs, into which the wedge *i* enters, thus forming a secure fastening. A gib, G, in the slot of the eyebolt E serves as a brace and support for the key *i*.

A second form of the fastening device consists in turning off the end of the eyebolt and providing it with a screw-thread, on which a nut, M, is fitted. In this mode of fastening it is desirable to have a washer, H, to use in connection with the nut, as in ordinary cases.

The washer is provided with a feather or radial projections, *f*, made to fit the recesses *e* of the lugs D and aid in preventing the nut from turning or slipping when under great pressure.

When it is desired to open the door to remove or replace the contents of the compress the fastening is loosened or detached, and the eyebolt is swung back to the position shown in Fig. 2, where it is out of the way of the operator, and unobstructed access is afforded.

In the use of my improvement several advantages are gained, as will be apparent from the construction. First, the compress is held more firmly because of the great strength which this construction admits. Second, the casing may be of comparatively-light metal by extending the shanks of the hinge-cleats into bands riveted to the casing and inclosing it, thus economizing cost. Third, the danger of the fastenings slipping and the door flying open in consequence of the great pressure necessary to be used is entirely obviated. Fourth, the parts resisting the strain are in a straight line and close to the periphery of the compress, consequently stronger and more durable. Fifth, the fastening devices are more convenient to handle and are not in the way of the operator when out of use.

Having described my invention, I claim—

1. In combination with the hinged door of a tobacco-compress, the eyebolts E, pivoted to one side of the divided casing and adapted to engage with fastenings, such substantially as described, on the other, so as to secure the door and to swing back out of the way when out of use, essentially as specified.

2. The swinging eyebolts E, pivoted to one side of the divided casing, in combination with lugs D D upon the other, and means, substantially as described, for securing the bolt between and to the lugs, essentially as specified.

3. The ears D D, provided with slots *e*, in combination with swing-bolts E and key *i*, or swing-bolt E′ and nut M, substantially as and for the purpose specified.

JOHN H. McGOWAN.

Witnesses:
L. M. HOSEA,
C. F. HESSER.